(12) United States Patent
A et al.

(10) Patent No.: US 11,165,647 B2
(45) Date of Patent: Nov. 2, 2021

(54) MANAGING MULTIPLE SEMANTIC VERSIONS OF DEVICE CONFIGURATION SCHEMAS

(71) Applicant: Juniper Networks, Inc., Sunnyvale, CA (US)

(72) Inventors: Chandrasekhar A, Bangalore (IN); Rahamath Sharif, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/456,976

(22) Filed: Jun. 28, 2019

(65) Prior Publication Data
US 2020/0412614 A1 Dec. 31, 2020

(51) Int. Cl.
*H04L 12/24* (2006.01)
*H04L 29/08* (2006.01)
*H04L 12/46* (2006.01)
*G06F 15/16* (2006.01)

(52) U.S. Cl.
CPC ...... *H04L 41/0846* (2013.01); *H04L 41/0806* (2013.01); *H04L 41/0836* (2013.01)

(58) Field of Classification Search
CPC ............. H04L 41/0846; H04L 41/0836; H04L 41/0806
USPC ........................................................ 709/220
See application file for complete search history.

(56) References Cited

U.S. PATENT DOCUMENTS

| 5,870,559 A | 2/1999 | Leshem et al. |
|---|---|---|
| 5,933,642 A | 8/1999 | Greenbaum et al. |
| 6,041,053 A | 3/2000 | Douceur et al. |
| 6,078,744 A | 6/2000 | Wolczko et al. |

(Continued)

FOREIGN PATENT DOCUMENTS

| CN | 109271621 A | 1/2019 |
|---|---|---|
| EP | 2961100 A1 | 12/2015 |

(Continued)

OTHER PUBLICATIONS

Harrington et al., "An Architecture for Describing Simple Network Management Protocol (SNMP) Management Frameworks," RFC 3411, Network Working Group, Dec. 2002, 65 pp.

(Continued)

*Primary Examiner* — Kevin T Bates
*Assistant Examiner* — Golam Mahmud
(74) *Attorney, Agent, or Firm* — Shumaker & Sieffert, P.A.

(57) ABSTRACT

A controller device manages a plurality of network devices. The controller device includes one or more processing units implemented in circuitry and configured to maintain a graph data structure representing device level configuration schemas for the plurality of network devices, the graph data structure including trie nodes for every first device level configuration schema element for a first model of a version of network device of the plurality of network devices; obtain corresponding second device level configuration schema elements based on a path for a second model of the version of the network device; determine a deviation between the second device level configuration schema element and the first device level configuration schema; and update the trie node to add a branch to a node representing the second device level configuration schema element.

20 Claims, 8 Drawing Sheets

(56) References Cited

U.S. PATENT DOCUMENTS

| | | | |
|---|---|---|---|
| 6,298,321 B1* | 10/2001 | Karlov | H03M 7/30 |
| | | | 701/1 |
| 6,678,646 B1 | 1/2004 | McConnell et al. | |
| 6,973,488 B1 | 12/2005 | Yavatkar et al. | |
| 7,209,473 B1 | 4/2007 | Mohaban et al. | |
| 7,457,296 B2 | 11/2008 | Kounavis et al. | |
| 7,953,779 B1* | 5/2011 | Ragusa | G06F 16/904 |
| | | | 707/999.102 |
| 8,069,374 B2 | 11/2011 | Panigrahy et al. | |
| 8,266,416 B2 | 9/2012 | Ishihara et al. | |
| 8,571,882 B1 | 10/2013 | Teitelbaum | |
| 8,572,717 B2 | 10/2013 | Narayanaswamy | |
| 9,117,071 B2 | 8/2015 | Beretta et al. | |
| 9,727,339 B2 | 8/2017 | Zelsnack | |
| 9,734,056 B2 | 8/2017 | Shi et al. | |
| 9,755,960 B2 | 9/2017 | Moisand et al. | |
| 9,979,738 B2 | 5/2018 | Holland et al. | |
| 10,102,172 B1 | 10/2018 | Mai et al. | |
| 10,122,872 B1* | 11/2018 | Shin | H04L 41/0859 |
| 10,148,506 B1* | 12/2018 | Anburose | H04L 41/0853 |
| 10,200,248 B1* | 2/2019 | Jiang | H04L 41/22 |
| 10,278,112 B1 | 4/2019 | A et al. | |
| 10,374,886 B1 | 8/2019 | A et al. | |
| 10,382,265 B1* | 8/2019 | Anburose | H04L 41/0816 |
| 10,516,761 B1* | 12/2019 | A | H04L 41/0803 |
| 10,558,542 B1* | 2/2020 | A | G06F 11/3051 |
| 10,567,223 B1 | 2/2020 | Sidaraddi et al. | |
| 2002/0019864 A1* | 2/2002 | Mayer | H04L 41/046 |
| | | | 709/223 |
| 2004/0064538 A1 | 4/2004 | Wong | |
| 2009/0164773 A1 | 6/2009 | Ishihara et al. | |
| 2012/0110028 A1 | 5/2012 | Athreya et al. | |
| 2013/0191766 A1 | 7/2013 | Ragusa et al. | |
| 2014/0181797 A1 | 6/2014 | Beretta et al. | |
| 2015/0381515 A1 | 12/2015 | Mattson et al. | |
| 2016/0062746 A1 | 3/2016 | Chiosi et al. | |
| 2016/0211988 A1 | 7/2016 | Lucas et al. | |
| 2016/0269250 A1 | 9/2016 | Astigarraga et al. | |
| 2016/0342397 A1 | 11/2016 | Goetz et al. | |
| 2016/0350095 A1 | 12/2016 | Ramachandran et al. | |
| 2017/0054758 A1 | 2/2017 | Maino et al. | |
| 2017/0099183 A1* | 4/2017 | Athan | G05B 19/0426 |
| 2017/0127466 A1* | 5/2017 | Narasimha | H04L 45/48 |
| 2017/0187577 A1 | 6/2017 | Nevrekar et al. | |
| 2018/0019917 A1* | 1/2018 | Agarwal | H04L 12/4641 |
| 2018/0150569 A1* | 5/2018 | Wechsler | G06F 16/9024 |
| 2018/0167277 A1 | 6/2018 | Mahimkar et al. | |
| 2018/0210927 A1 | 7/2018 | Karam et al. | |
| 2018/0232402 A1* | 8/2018 | Bhatti | G06F 16/9024 |
| 2018/0276863 A1 | 9/2018 | Nerurkar et al. | |
| 2018/0329958 A1 | 11/2018 | Choudhury et al. | |
| 2019/0104026 A1* | 4/2019 | Zhang | H04L 41/145 |
| 2019/0182119 A1 | 6/2019 | Ratkovic et al. | |
| 2019/0266619 A1 | 8/2019 | Namba et al. | |
| 2020/0084120 A1 | 3/2020 | A et al. | |

FOREIGN PATENT DOCUMENTS

| | | |
|---|---|---|
| FR | 2902954 A1 | 12/2007 |
| WO | 2017204872 A1 | 11/2017 |

OTHER PUBLICATIONS

U.S. Appl. No. 15/462,465, Juniper Networks, Inc. (Inventor: Chandrasekhar A) filed Mar. 17, 2017.

U.S. Appl. No. 16/125,245, Juniper Networks, Inc. (Inventor: Chandrasekhar A) filed Sep. 7, 2018.

U.S. Appl. No. 16/282,160, Juniper Networks, Inc. (Inventor: Chandrasekhar A) filed Feb. 21, 2019.

Enns, "NETCONF Configuration Protocol," Network Working Group, RFC 4741, Dec. 2006, 96 pp.

Bjorklund, "YANG—A Data Modeling Language for the Network Configuration Protocol (NETCONF)," Internet Engineering Task Force, RFC 6020, Oct. 2010.

"Gremlin Docs," gremlindocs.spmallette.documentup.com, retrieved on Mar. 29, 2019, 34 pp.

"Gremlin," Github, github.com/tinkerpop/gremlin/wiki, Jul. 11, 2016, 4 pp.

"Openconfig," openconfig.net, 2016, 1 pp. (Applicant points out, in accordance with MPEP 609.04(a), that the year of publication, 2016, is sufficiently earlier than the effective U.S. filing date, so that the particular month of publication is not in issue.).

"OpenConfig," Github, github.com/openconfig, retrieved on Mar. 29, 2019, 3 pp.

U.S. Appl. No. 16/370,243, Juniper Networks, Inc. (Inventor: Chandrasekhar A) filed Mar. 29, 2019.

Bierman et al., "RESTCONF Protocol," IETF, RFC 8040, Jan. 2017, 137 pp.

"Introduction to GraphQL," https://graphql.org/learn/, Accessed Sep. 20, 2018, 3 pp.

Byron, "GraphQL: A data query language," https://code.fb.com/core-data/graphql-a-data-query-language/, Posted Sep. 14, 2015, 5 pp.

Jiang et al., "Translating High-Level Configuration Instructions to Low-Level Device Configuration," U.S. Appl. No. 15/198,657, filed Jun. 30, 2016.

Chandrasekhar et al., "Processing Multiple Parallel High Level Configuration Changes for Managed Network Devices," U.S. Appl. No. 15/396,262, filed Dec. 30, 2016.

Athanas et al., "An Adaptive Hardware Machine Architecture and Compiler for Dynamic Processor Reconfiguration," Laboratory for Engineering Man/Machine Systems, Division of Engineering, Brown University, 1991, 4 pp.

Nguyen, "Model-based Version and Configuration Management for a Web Engineering Lifecycle," Proceedings of the 15th International Conference on World Wide Web, ACM, New York, NY, May 23, 2006, 10 pp.

Ribeiro et al., "G-Tries: an efficient data structure for discovering network motifs," Proceedings of the 2010 ACM Symposium on Applied Computing, New York, NY, Mar. 22, 2010, 8 pp.

Sivakumar et al., "Concepts of Network Intent," draft-moulchan-nmrg-network-intent-concepts-00, Internet Research Task Force, Oct. 28, 2017, 10pp.

Sadasivarao et al., "Demonstration of Advanced Open WDM Operations and Analytics, based on an Application—Extensible, Declarative, Data Model Abstracted Instrumentation Platform," 2019 Optical Fiber Communications Conference and Exhibition, OSA, Mar. 3, 2019, 3 pp.

Extended Search Report from counterpart European Application No. 19199447.4, dated Feb. 18, 2020, 31 pp.

U.S. Appl. No. 16/144,313, Juniper Networks, Inc. (Inventor: Chandrasekhar A) filed Sep. 27, 2018.

U.S. Appl. No. 16/370,189, Juniper Networks, Inc. (Inventor: Chandrasekhar A) filed Mar. 29, 2019.

Wallin et al., "Automating Network and Service Configuration Using NETCONF and YANG," Sep. 23, 2011, 13 pp.

Cechak, "Using GrahpQL for Content Delivery in Kentico Cloud," Masaryk University Faculty of Informatics, Bachelor's Thesis, Fall 2017, 63 pp.

Response to Extended Search Report dated Feb. 18, 2020 from counterpart European Application No. 19199447.4, filed Jun. 29, 2021, 18 pp.

\* cited by examiner

MANAGING MULTIPLE SEMANTIC VERSIONS OF DEVICE CONFIGURATION SCHEMAS

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3 VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for managing network devices. A network management system (NMS) device, also referred to herein as a controller device, may configure network devices using low-level (that is, device-level) configuration data, e.g., expressed in Yet Another Next Generation (YANG) data modeling language. Moreover, the controller device may manage the network devices based on the configuration data for the network devices. According to the techniques of this disclosure, the controller device may maintain a graph data structure including a trie node to represent deviations in device level configuration models for a common model of network device (e.g., two different versions of configuration schemas for the same model of network device). That is, each trie node may represent the model for a path in the configuration schema. The trie node may indicate whether, for example, certain configuration parameters are not applicable to a particular version of the model of network device and/or whether additional schema properties are added for the particular version of the model of network device.

In one example, a method of managing a plurality of network devices includes maintaining, by a controller device that manages a plurality of network devices, a graph data structure representing device level configuration schemas for the plurality of network devices, the graph data structure including trie nodes for every first device level configuration schema element for a first model of a version of network device of the plurality of network devices; obtaining, by the controller device, corresponding second device level configuration schema elements based on a path for a second model of the version of the network device; determining, by the controller device, a deviation between the second device level configuration schema element and the first device level configuration schema element; and updating, by the controller device, the trie node to add a branch to a node representing the second device level configuration schema element.

In another example, a controller device manages a plurality of network devices. The controller device includes one or more processing units implemented in circuitry and configured to maintain a graph data structure representing device level configuration schemas for the plurality of network devices, the graph data structure including trie nodes for every first device level configuration schema element for a first model of a version of network device of the plurality of network devices; obtain a second device level configuration schema elements based on a path for a second model of the version of the network device; determine a deviation between the second device level configuration schema element and the first device level configuration schema; and update the trie node to add a branch to a node representing the second device level configuration schema element.

In another example, a computer-readable storage medium has stored thereon instructions that, when executed, cause a processor of a controller device that manages a plurality of network devices to maintain a graph data structure representing device level configuration schemas for the plurality of network devices, the graph data structure including trie nodes for every first device level configuration schema element for a first model of a version of network device of the plurality of network devices; obtain a second device level configuration schema elements based on a path for a second model of the version of the network device; determine a deviation between the second device level configuration schema element and the first device level configuration schema; and update the trie node to add a branch to a node representing the second device level configuration schema element.

The details of one or more examples are set forth in the accompanying drawings and the description below. Other features, objects, and advantages will be apparent from the description and drawings, and from the claims.

DETAILED DESCRIPTION

Figure 1:
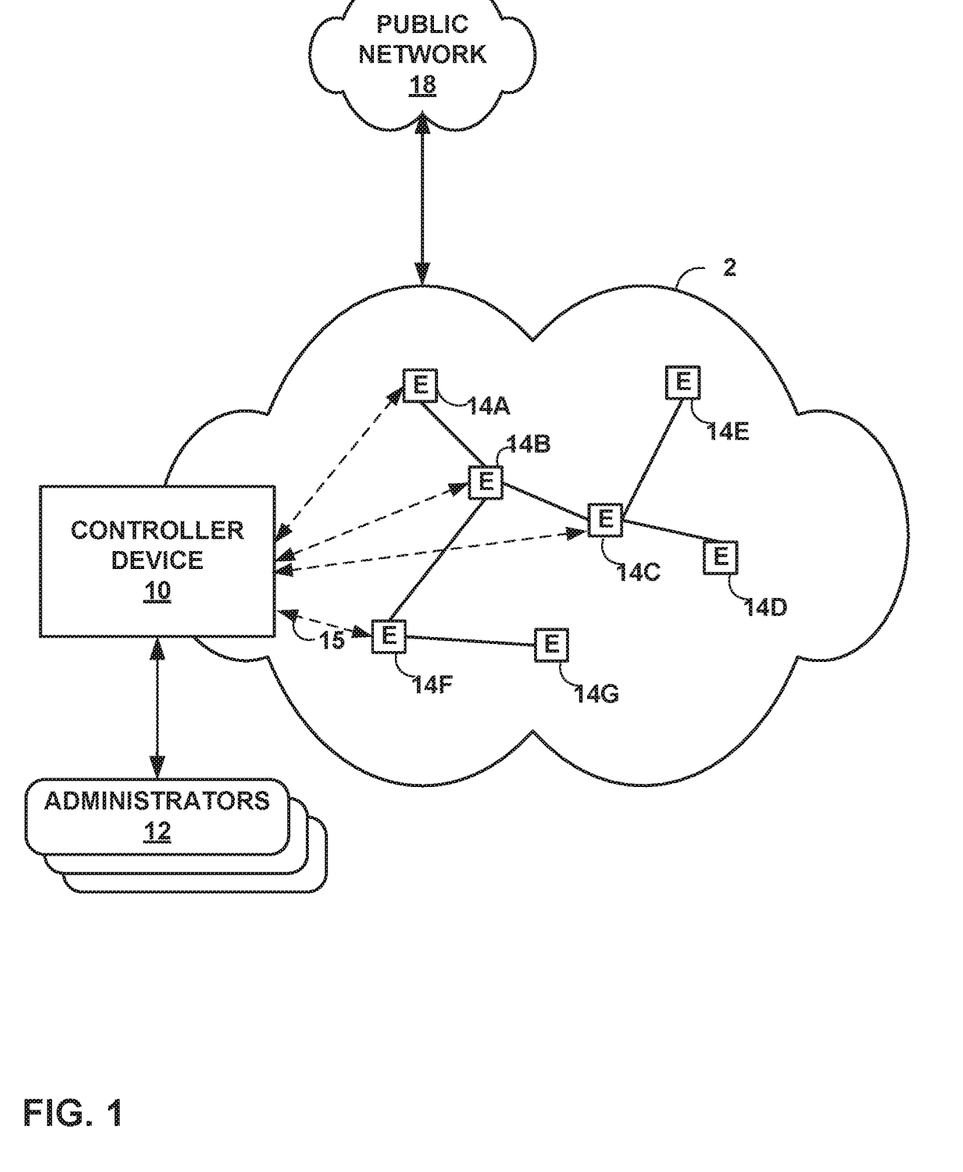
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrators 12 uses controller device 10 (or multiple such management devices) to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. As another example, Network Configuration Protocol (NETCONF) provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference.

In common practice, controller device 10, also referred to as a network management system (NMS) or NMS device, and elements 14 are centrally maintained by an IT group of the enterprise. Administrators 12 interacts with controller device 10 to remotely monitor and configure elements 14. For example, administrators 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrators 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrators 12 uses controller device 10 to configure elements 14 to specify certain operational characteristics that further the objectives of administrators 12. For example, administrators 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol, NETCONF protocol, or a derivative thereof, such as the Juniper Device Management Interface, to perform the configuration. Controller device 10 may establish NETCONF sessions with one or more of elements 14.

Controller device 10 may be configured to compare a new intent data model to an existing (or old) intent data model, determine differences between the new and existing intent data models, and apply the reactive mappers to the differences between the new and old intent data models. In particular, controller device 10 determines whether the new data model includes any additional configuration parameters relative to the old intent data model, as well as whether the new data model modifies or omits any configuration parameters that were included in the old intent data model.

The intent data model may be a unified graph model, while the low-level configuration data may be expressed in YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020. In some examples, the intent data model may be expressed in YAML Ain't Markup Language (YAML). Controller device 10 may include various reactive mappers for translating the intent data model differences. These functions are configured accept the intent data model (which may be expressed as structured input parameters, e.g., according to YANG or YAML). The functions are also configured to output respective sets of low-level device configuration data model changes, e.g., device configuration additions and removals. That is, y1=f1(x), y2=f2(x), . . . yN=fN(x).

Controller device 10 may use YANG modeling for intent data model and low-level device configuration models. This data may contain relations across YANG entities, such as list items and containers. As discussed in greater detail below, controller device 10 may convert a YANG data model into a graph data model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the unified intent data model. Controller device 10 may be configured to use the same compilation logic for each of create, update, and delete as applied to the graph model.

In general, controllers, like controller device 10, use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources. Customer environments may be configured to allow customers (e.g., administrators 12) to control intent realization and assure programmed intents.

YANG may be used as a data modeling language to manage configuration and state for managed network devices, such as elements 14. Elements 14 may support YANG as a data modeling language, while controller device 10 may use YANG modeling for a vendor agnostic configuration model. Elements 14 of enterprise network 2 may include various vendor devices, models, and software versions (e.g., operating system versions).

Network management systems may use a device model schema to check whether an intent change (abstract configuration) is valid for particular network devices of elements 14, to merge configuration, to generate data representing differences between configuration (configuration delta), and configlets. In general, configlets allow users, such as administrators 12, to manage configuration of any configurable parameter in profiles for elements 14. Thus, controller device 10 may provide data representing each of the available configurable parameters for each of elements 14, which may depend on software versions installed on elements 14. Elements 14 themselves may use translators to convert from an abstract data model to a native data model. That is, elements 14 may support open configuration YANG data models natively.

Controller device 10 may further compile intents to form low-level (i.e., device level) configuration, as noted above. In some instances, two or more device-level configuration schemas may be produced for a model of network device. For example, there may be multiple different configuration schemas for a particular model of a switch or router, e.g., because different instances of the switch or router may have different versions of an operating system (such as JUNOS) installed. Thus, compilation of intents or other high-level configuration data may result in two or more device-level configuration for network devices of the same model (e.g., different versions of the same model of network device).

In accordance with the techniques of this disclosure, controller device 10 may maintain a graph data structure (e.g., modeled in YANG) to include device level configuration schemas. In particular, when two or more device level configuration schemas are available for a model of network device, controller device 10 may store a trie-type node including branches for each element of respective device level configuration schema. These techniques are discussed in greater detail below.

Using a trie-type node in this manner provides an efficient way of loading and maintaining a hierarchical schema in memory. For example, these techniques may provide an efficient way of keeping both a "device model" schema and one or more "version" schemas in memory, without having multiple copies of the schemas. There may be many models (m) of network devices and versions (n) of each model, and thus, these techniques may be used to avoid maintaining m*n variations of the schemas. Thus, these techniques may be used to address memory constraint issues of previous techniques for managing network devices using multiple schemas. These techniques also support on demand loading of schemas for new models and device versions.

Elements 14 may support open configuration modules, although such modules are not yet mature. RFC 6020 indicates that YANG versions are to be backward compatible. As open configuration/IETF modules are still being developed, it is not yet possible to maintain a YANG version standard. Opencofig (described at www.openconfig.net/docs/semver) follows the Semantic version. When the Semantic version is followed, there should be an efficient way to load schemas into memory.

In distributed architectures, functionality may spread across microservices. These microservices may need to access the schema of certain fields. In these applications, there should be a way to load the schema to microservices and load the required properties alone. A data structure may be provided to support on demand loading of schema properties. Suppose, for example, a configuration manager requires a data type, list, and key properties from a schema. A configlet designer microservice may require all of the properties, such as enumeration (enum) values, description, leaf default type, extensions, and the like. A system should be able to load a few properties alone, and later the data structure should support loading the additional properties. This disclosure describes techniques to support such on demand loading of schema properties.

In general, according to the techniques of this disclosure, controller device 10 may be configured to use a variant of a trie data structure (generally referred to herein simply as a "trie data structure") within a graph data structure to maintain deviations alone between multiple schema element versions. That is, the trie data structure may include separate branches for each version of a schema element. Using a trie data structure in this way may improve memory usage and access speed. While loading schemas into the trie data structure, the trie data structure expands. Controller device 10 may be configured with a threshold value and, once the trie data structure exceeds the threshold value, controller device 10 may adjust nodes in the trie data structure to shrink the trie data structure. This may further improve memory usage and access speed. Use of the trie data structure to store schema elements may reduce the memory footprint of the graph data structure. The trie data structure of this disclosure may be used in many scenarios where values with deviations are to be populated. Although generally described with respect to storing a device-level configuration model for network devices, the trie data structure may be used when storing a model representing hardware inventory, the meanings of words in a dictionary for various sublanguages, or other uses.

Figure 2:
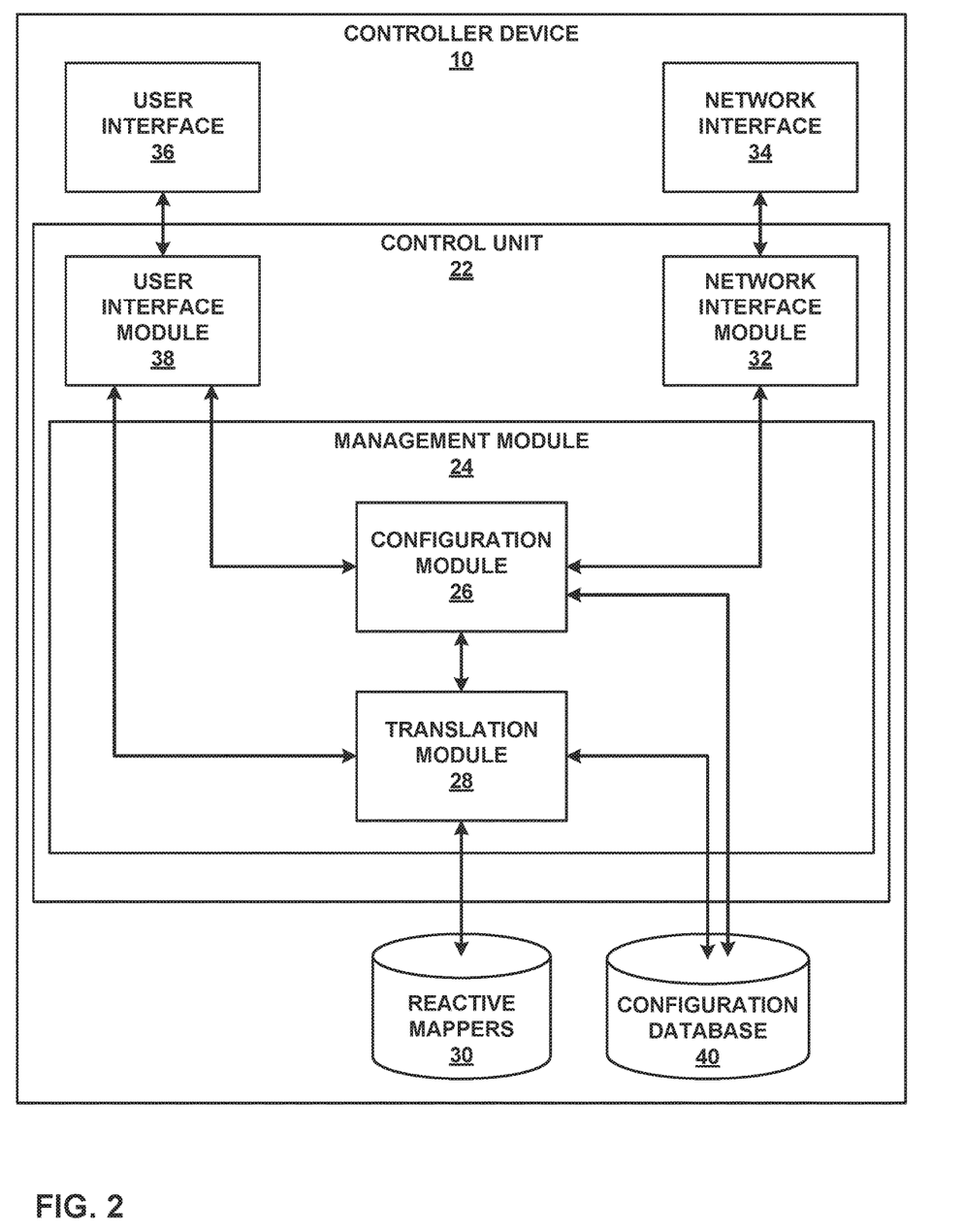
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrators 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34, User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., elements 14 of FIG. 1. Management includes, for example, configuring the network devices according to instructions received from a user (e.g., administrators 12 of FIG. 1) and providing the user with the ability to submit instructions to configure the network devices. In this example, management module 24 further includes configuration module 26 and translation module 28.

Management module 24 is configured to receive intent unified-graph-modeled configuration data for a set of managed network devices from a user, such as administrators 12. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent data model to device-specific, low-level configuration instructions.

Controller device 10 also includes configuration database 40. Configuration database 40 generally includes information describing managed network devices, e.g., elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., intent data model, or in some cases, both intent data model and low-level configuration information) for the managed devices (e.g., elements 14).

Translation module 28 determines which of reactive mappers 30 to execute on the intent data model based on the information of configuration database 40, e.g., which of the devices are to receive the low-level configuration instructions. Translation module 28 then executes each of the determined reactive mappers of reactive mappers 30, providing the intent data model to the reactive mappers as input and receiving low-level configuration instructions. Translation module 28 may also be referred to as an intent compiler, which is a service containing a set of mappers, such as reactive mappers 30.

Configuration module 26 may first determine an existing intent data model for each service performed by the devices for which configuration is to be updated, e.g., by retrieving the intent data model for each of the services from configuration database 40. Configuration module 26 may then compare the existing intent data model (also referred to herein as a deployed graph model) to the newly received intent data model, and determine differences between the existing and newly received intent data models (also referred to as an undeployed graph model). Configuration module 26 may then add these changes to the compiler stream, and reactive mappers 30 may then translate these changes to low-level configuration information. The changes may be included in a change set, which may be a list containing intent graph vertices and corresponding version identifiers. Management module 24 may use the change set to track the list of vertices changed in an intent update. After the intent has been committed, management module 24 may use the change set to update vertex states in the intent graph model. Configuration module 26 also updates the existing intent data model recorded in configuration database 40 based on the newly received intent data model.

In some examples, reactive mappers 30 that perform update translations (that is, translating changes in the unified intent data model that results in updates to values of low-level configuration information, without creation or deletion of elements in the low-level configuration data) may operate as follows. In one example, the reactive mappers 30 that perform updates may override single elements. That is, performance of these reactive mappers may result in deletion of an element value, e.g., by replacing an old element value with a new value. Sometimes, a single value in a configuration service model can be mapped to a list in a device configuration. In these cases, translation module 28 may send the old value as well as the new value.

Translation module 28 (which may be configured according to reactive mappers 30) may use the same reactive mapper for creation, updates, and deletion of intent data model vertices. Because each vertex has its own corresponding reactive mapper, compilation can be performed in parallel. That is, the reactive mappers of each of the vertices of the graph model representing the unified intent data model can be executed in parallel, thereby achieving parallel compilation. Translation module 28 may be configured to allow processing of only impacted intent data model data changes (i.e., those elements in the intent data model that are impacted by the changes). Based on reactive mappers 30, translation module 28 may infer dependencies across vertices in the intent data model. When the intent data model is changed, translation module 28 may publish messages in the compiler stream based on a dependency graph, as discussed above.

When a "create" template is uploaded (that is, a reactive mapper of reactive mappers 30 that processes new data in intent data model configuration information, relative to existing intent data model configuration information), translation module 28 may determine the dependencies using the dependency graph. When the service is changed, translation module 28 may generate a difference between the existing intent data model configuration information and the new intent data model configuration information, based on the dependencies. Translation module 28 may then use the reactive mapper of reactive mappers 30 to process the difference, and thereby translate the intent data model configuration information to low-level configuration instructions. Translation module 28 may then provide the low-level configuration instructions to configuration module 28.

After receiving the low-level configuration instructions from translation module 28, configuration module 28 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrators 12 (FIG. 1) to interact with controller device 10, other interfaces may be used in other examples. For example, controller device 10 may include a representational state transfer (REST) client (not shown) that may act as an interface to another device, by which administrators 12 may configure controller device 10. Likewise, administrators 12 may configure elements 14 by interacting with controller device 10 through the REST client.

Management module 24 may model configuration database 40 as a graph data structure (or graph database) representing YANG configuration data elements. YANG specifies various types of data structures, including lists, leaflists, containers, containers with presence, and features. Management module 24 may model each of lists, containers, containers with presence, and features, as well as a top-level container, as vertices in a graph data structure. Alternatively, configuration database 40 may represent YAML configuration data elements.

In some cases, management module 24 may manage multiple different models of devices of the same version of network device. For example, a particular version of a router or switch may have multiple different models, each having its own sets of particular configuration parameters, while also sharing a common set of configuration parameters for the version generally. In accordance with techniques of this disclosure, management module 24 may maintain graph data structures including trie data structures for each configuration element. The trie data structures may represent the common set of configuration parameters and deviations from the common set of configuration parameters for the various models of the version of the network device.

The trie data structure may include branches for each model of the version of the network device having a deviation in a corresponding device-level configuration data schema element. Thus, when managing (e.g., configuring) a model of the network device, management module 24 may determine appropriate configuration parameters using a corresponding branch of the trie data structure.

After constructing the graph data structure, management module 24 may perform operations on data of the graph data structure. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github.com/tinkerpop/gremlin/wiki. Management module 24 may execute conditions mapped to vertices and edges of the graph data structure if the condition attributes are changed. In response to the conditions, management module 24 may process additional changes, handled as functions as discussed in greater detail below. Management module 24 may further update all changes in transaction semantics.

In this manner, controller device 10 represents an example of a controller device that manages a plurality of network devices and includes one or more processors implemented in circuitry and configured to maintain a graph data structure representing device level configuration schemas for the plurality of network devices, the graph data structure including trie nodes for every first device level configuration schema element for a first model of a version of network device of the plurality of network devices; obtain a second device level configuration schema elements based on a path for a second model of the version of the network device; determine a deviation between the second device level configuration schema element and the first device level configuration schema; and update the trie node to add a branch to a node representing the second device level configuration schema element.

Figure 3:
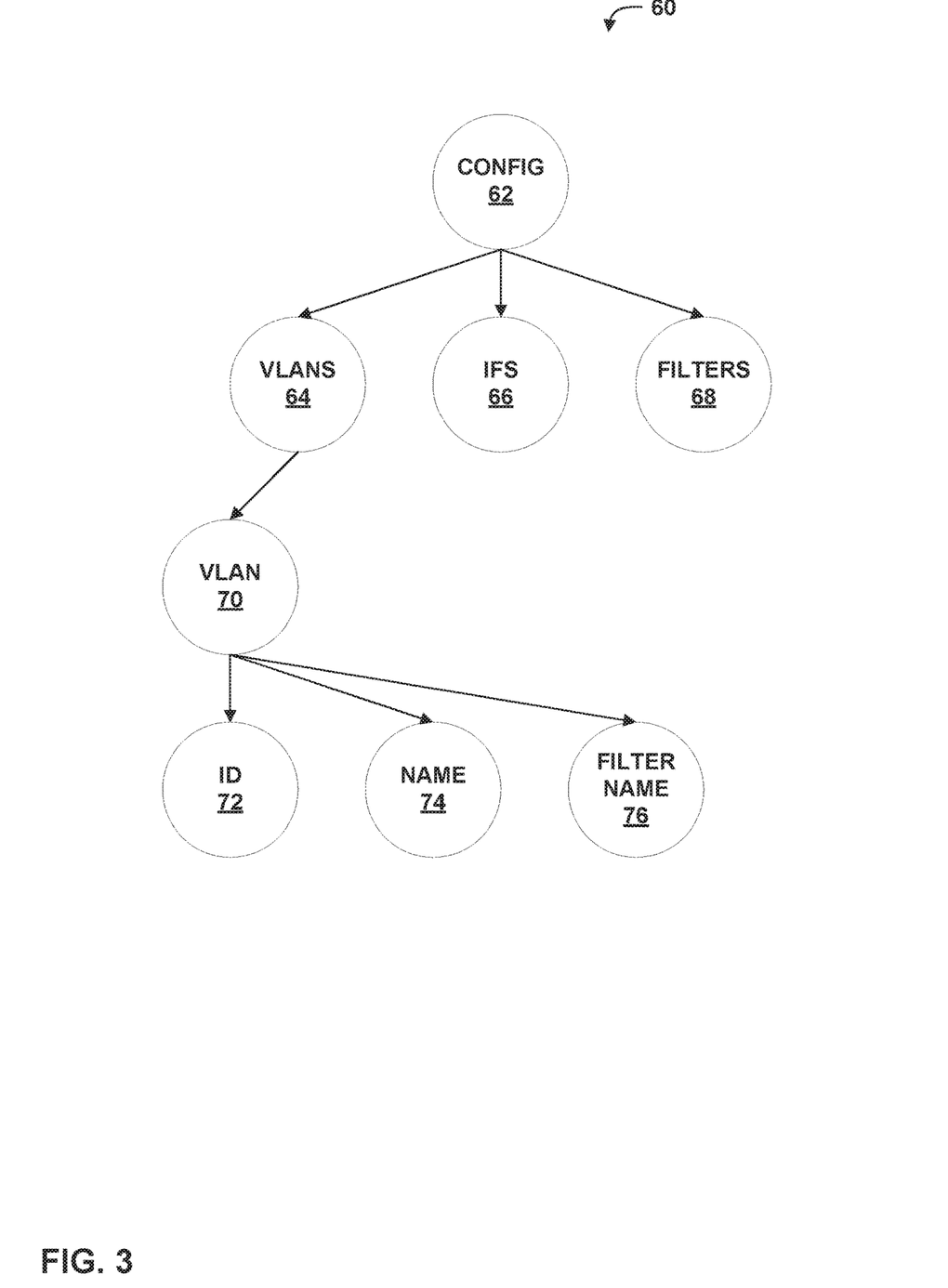
FIG. 3 is a graph illustrating an example hash map data structure.

FIG. 3 is a graph illustrating an example hash map data structure 60. Hash map data structure 60 includes a root configuration (config) node 62, virtual local area networks (VLANS) node 64, interfaces (IFs) node 66, filters node 68, VLAN node 70, identifier (ID) node 72, name node 74, and filter name node 76. In this example, there are edges from config node 62 to each of VLANS node 64, IFs node 66, and filters node 68. VLANS node 64 has an edge to VLAN node 70, and VLAN node 70 has edges to each of ID node 72, name node 74, and filter name node 76.

Hash map data structure 60 is one example of a data model that is hierarchical in nature. Nodes of hash map data structure 60 may be identified by schema paths, where child nodes of a common parent node share a common prefix for the schema path. Controller device 10 may maintain a schema for each path. The paths include, for example:

/configuration/vlans (corresponding to VLANS node 64)
/configuration/vlans/vlan (corresponding to VLAN node 70)
/configuration/vlans/vlan/name (corresponding to name node 74)
/configuration/vlans/vlan/vlan-id (corresponding to ID node 72)
/configuration/vlans/vlan/filter-name (corresponding to filter name node 76)

Conventionally, a controller device such as controller device 10 would maintain such a hash map with a path as key and a schema as a value for the key. However, this can lead to a large amount of memory consumption when many different models of a common version of network device are managed. Thus, according to the techniques of this disclosure, controller device 10 may represent deviations among configuration elements for various models of a common version of network device using a trie data structure.

Figure 4:
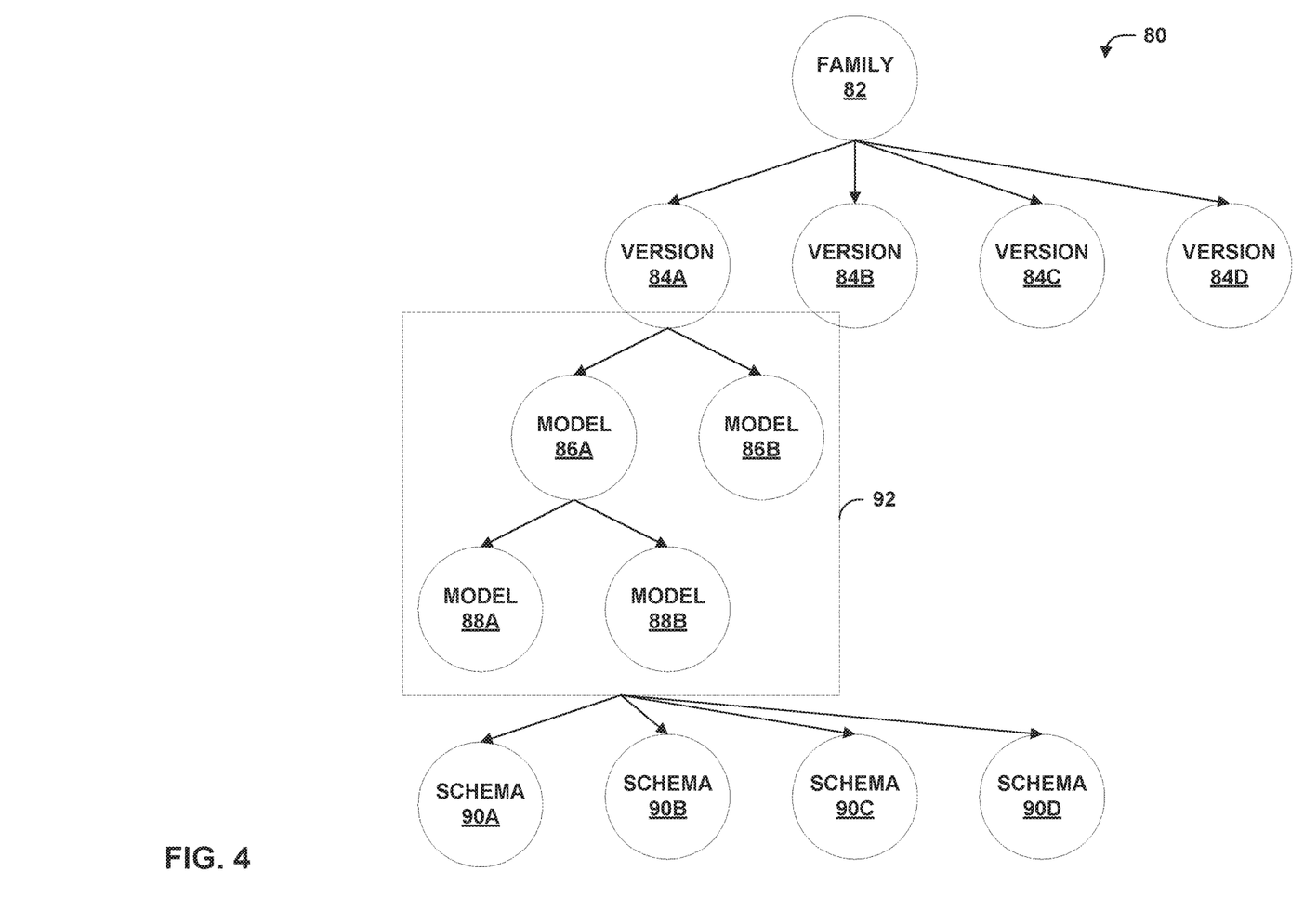
FIG. 4 is a graph illustrating an example graph data structure including a trie data structure according to the techniques of this disclosure.

FIG. 4 is a graph illustrating an example graph data structure 80 including a trie data structure 92 according to the techniques of this disclosure. In this example, graph data structure 80 includes family node 82. Family node 82 represents a family of devices, e.g., a family of routers or a family of switches. Family node 82 includes edges to child version nodes 84A-84D (version nodes 84). For example, version node 84A may represent version 9.1 of a switch, version node 84B may represent version 9.2 of the switch, version node 84C may represent version 9.3 of the switch, and version node 84D may represent version 10.1 of the switch.

In this example, version node 84A is the root of trie data structure 92. A conventional trie data structure has branches for each character in a string. The trie data structure of this disclosure is a variant of the conventional trie data structure, in that multiple characters of the string may be used in each node to describe a path for reaching the node. For example, model node 86A may represent model "4200" of version 9.1 of the switch, model node 88A may represent model "4200-24T" of version 9.1 of the switch, and model node 88B may represent model "4200-48T" of version 9.1 of the switch. Model node 86B may represent model "2400" of version 9.1 of the switch.

Each of model nodes 86A, 86B, 88A, and 88B may correspond to deviations of schemas for version 9.1 of the switch (i.e., the version represented by version node 84A). Schema nodes 90A-90D of FIG. 4 may generally represent variations for a schema element. For example, schema node 90A may represent deviations for a schema element for model node 86A relative to version node 84A, schema node 90B may represent deviations for a schema element for model node 86B relative to version node 84A, schema node 90C may represent deviations for a schema element for model node 88A relative to model node 86A, and schema node 90A may represent a deviations for a schema element for model node 88B relative to model node 86A.

In this manner, graph data structure 80 represents a pattern in device configuration management. In general, there are fewer variations in schemas within a device family for a given version of a device in the device family. There may be no schema changes in a patch and various releases. There may be deviations on a model starting from a device version, and a new schema element may be supported starting from a particular version of a device. Using the techniques of this disclosure represented in FIG. 4 may represent deviations in schema elements alone, rather than full schemas for each of the models corresponding to model nodes 86A, 86B, 88A, and 88B. Thus, memory storage and access speed may be improved using the techniques of this disclosure. The trie according to the techniques of this disclosure may take the value of the hierarchical schema trie node. That is, the nodes of trie data structure 92 may take values of the corresponding models for model nodes 86A, 86B, 88A, 88B.

Figure 5:
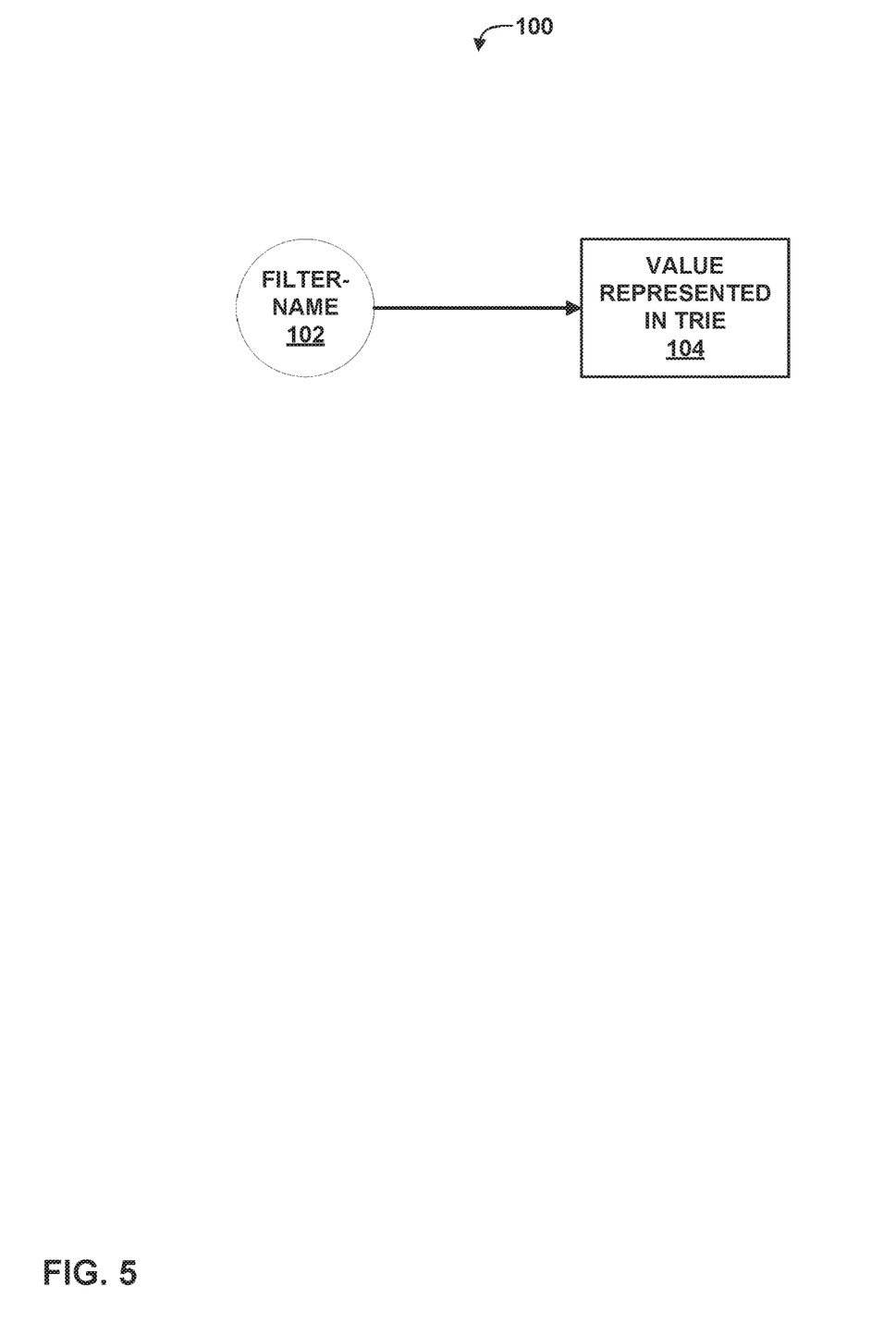
FIG. 5 is a conceptual diagram illustrating a graph representing correspondence between a node and a value represented in a trie data structure for the node.

FIG. 5 is a conceptual diagram illustrating a graph 100 representing correspondence between a node and a value represented in a trie data structure for the node. In this example, graph 100 includes filter name node 102 corresponding to value represented in trie 104. As noted above, a trie may include a value for a hierarchical schema trie node.

Figure 6A:
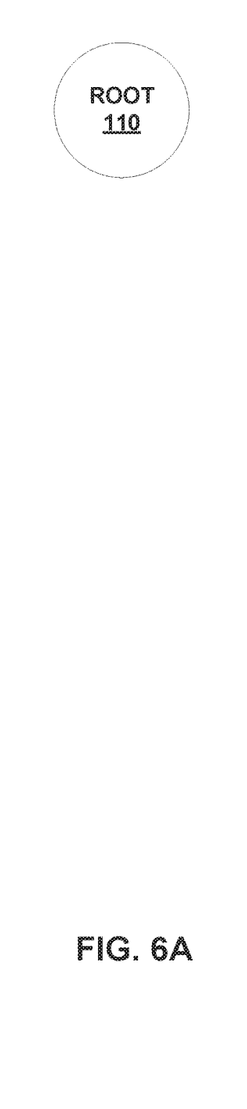
FIGS. 6A-6C are graphs illustrating example graph data structures following loading of various example schemas according to the techniques of this disclosure.
Figure 6B:
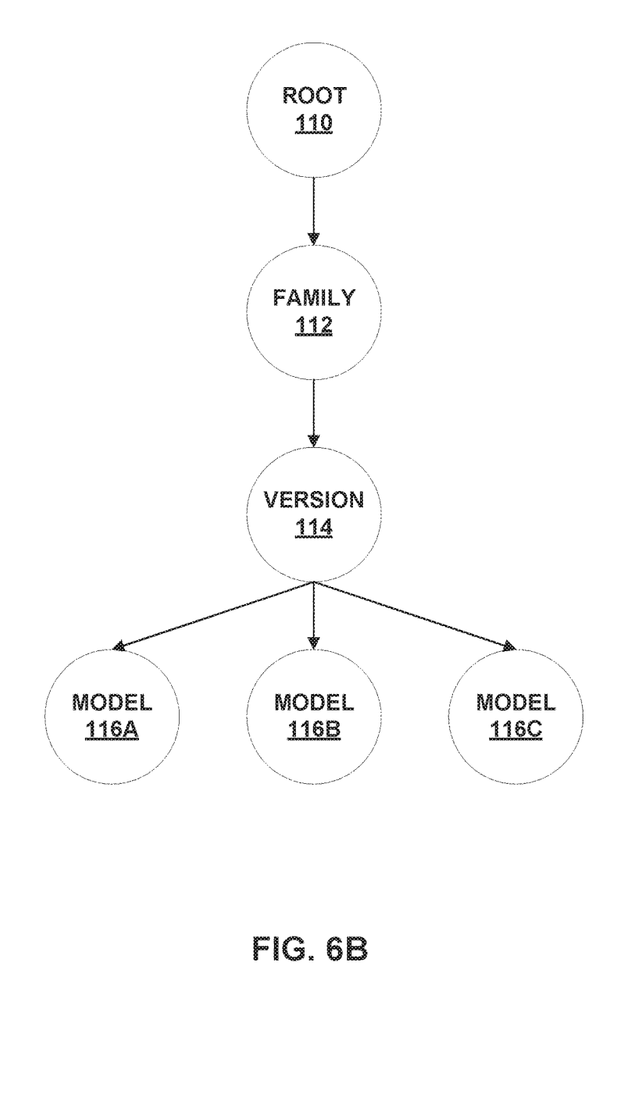
Figure 6C:
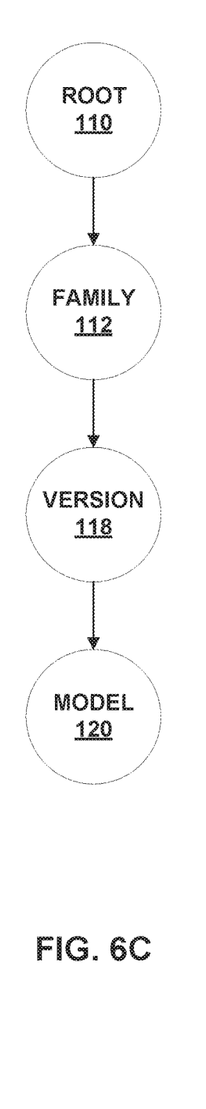

FIGS. 6A-6C are graphs illustrating example graph data structures following loading of various example schemas according to the techniques of this disclosure. Assume, for example, that IEEE 802.1 X is supported on all switch platforms of version 10.4, except for model 8200, and that IEEE 802.1 X is not supported in security devices and routers. An example loading order of schemas for family names, models, and versions of devices is shown below:

A) Security 9.0
B) Switch 9.0
C) Switch 10.4, model 8200
D) Switch 10.4, model 9200
E) Switch 10.4, model 2200
F) Switch 10.4, model 3200
G) Switch 10.4, model 4200
H) Security 9.1, 9.2, 9.3, 9.4

FIG. 6A includes root node 110, which may represent the entire graph data structure following steps A-C above. That is, no deviations are included among configuration for the various devices in the security and switch families of devices for version 9.0 and 10.4 for IEEE 802.1 X under the assumptions stated above, and thus, no additional nodes are needed.

FIG. 6B includes root node 110 with an edge to family node 112 (representing the switch family of devices), family node 112 having an edge to version node 114 (representing version 10.4 of a switch), and version node 114 having edges to model nodes 116A, 116B, and 116C. FIG. 6B represents a state of the graph data structure following steps C, D, an E discussed above. Under the assumptions stated above, there is a deviation between model 9200 and model 8200 of switch version 10.4, because model 9200 supports IEEE 802.1 X, whereas model 8200 does not. Thus, controller device 10 may construct the graph data structure to add model nodes 116A, 116B, and 116C to indicate support for IEEE 802.1 X and set configuration information accordingly, whereas version node 114A may indicate that IEEE 802.1 X is not supported for other models generally.

As noted above, in some examples, controller device 10 may be configured with a threshold value for a number of deviations for a schema element. In this example, the threshold value may be 3. After the threshold value is met or exceeded, controller device 10 may reconfigure the graph data structure to switch what is considered a deviation and what is considered standard across the version. Thus, after step G, in which yet another switch model (model 4200) has support for IEEE 802.1 X, controller device 10 may reconfigure the graph data structure to indicate support for IEEE 802.1 X for version 10.4 of a switch, with a deviation for model 8200. Accordingly, FIG. 6C represents the state of the graph data structure following step G above with the reconfigured graph data structure. In particular, FIG. 6C illustrates root node 110 with an edge to family node 112. Family node 112 in this example has an edge to version node 118 (representing version 10.4 of the switch), and version node 118 has an edge to model node 120. In this example, version node 118 may indicate support for IEEE 802.1 X generally, and model node 120 may indicate that for model 8200, IEEE 802.1 X is not supported. There is no change to the graph data structure after step H.

After having constructed the graph data structure of FIG. 6C, retrieval of a schema element for a security device of version 9.1, 9.2, 9.3, or 9.4 would take only one lookup (being root node 110). Retrieval of the schema element for a switch of version 10.4 generally would take two lookups, corresponding to version node 118.

Controller device 10 may be configured to perform a graph data structure insertion algorithm according to the techniques of this disclosure. The graph data structure insertion algorithm may be as follows:

```
insertSchema(Trie, path[ ],Element) {
    Path [ ] = =[Family, Version, Model]
    Element= SchemaElement
    If the Trie is empty, Create Root Tree node with Element and add to Trie
    If the Trie is not empty:
        Call UpdateElement(root, paths, Element)
}
```

Controller device 10 may also be configured to perform a graph data structure element update algorithm, as follows:

```
UpdateElement (TrieNode,keyPath[ ],Value) {
    Check TrieNode have children with key path[0]
    If children not found, and the value is same as TrieNode value
```

```
        Append the path to Non deviated elements (This step is optional, this
        can be maintained globally for schemas)
        Break;
    If children are found, and the value is same as matched children value,
        Append the path to Non deviated elements (This step is optional, this
        can be maintained globally for schemas).
        Break;
    If children is found, and the value is not same as matched children value
        If the keyPath.length is 0
            Create/update ChildTrieNode with value and attach to
            TrieNode
            If the number of Children matches the threshold
                Call AdjustDeviations(TrieNode)
            else
                Call UpdateElement(matchedChildNode,
                ReaminingKeyPath, Value)
```

Figure 7A:
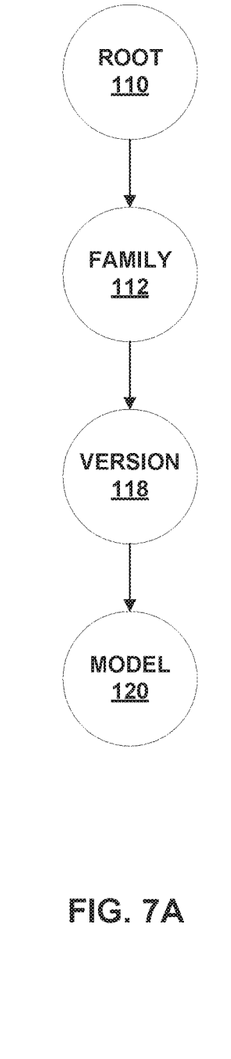
FIGS. 7A-7C are graphs illustrating example graph data structures following further loading of various example schemas according to the techniques of this disclosure.
Figure 7B:
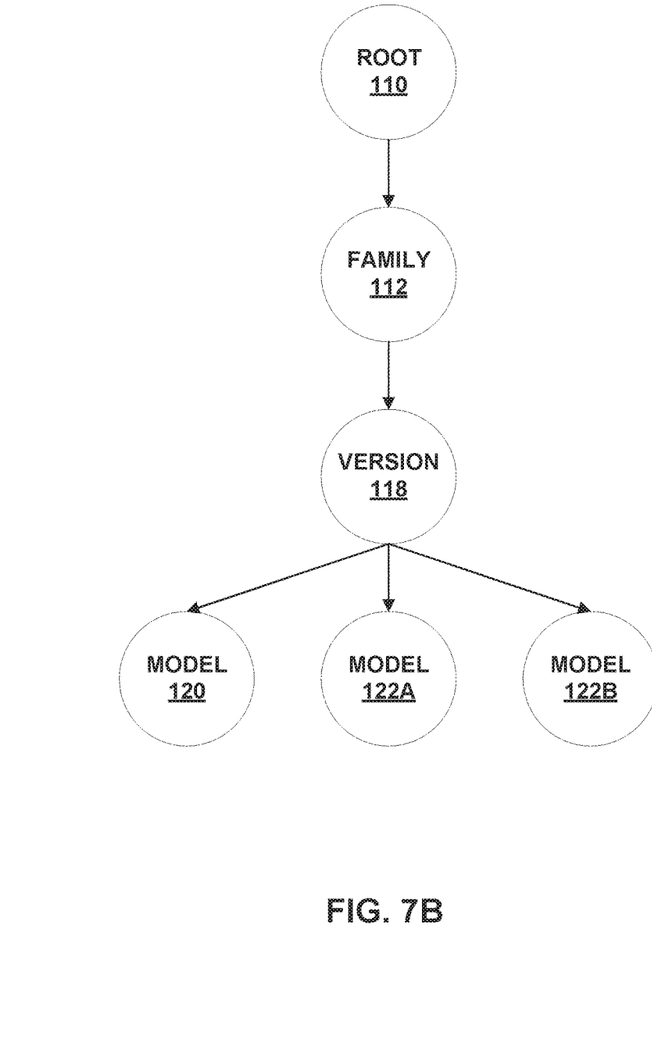
Figure 7C:
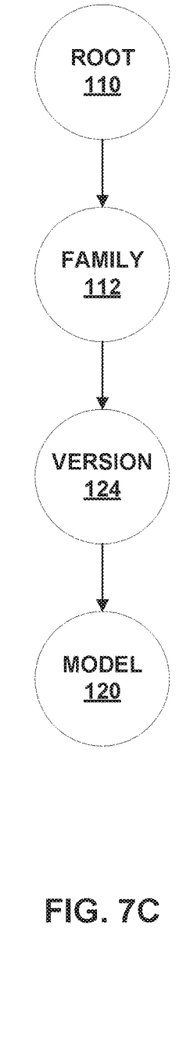

Controller device 10 may also be configured to perform a graph data structure adjust deviations algorithm, as follows:
Get Parent Node's non-deviated elements. This can be maintained along with Trie node
Compare the "Non deviated element count" to "Deviated element count"
If Deviated element count is more than Non deviated element count:
  Change the Parent Trie node value
  Interchange the "Non-deviated children" to "Deviated children"
Follow this recursively for parent nodes Controller device 10 may also be configured to perform a graph data structure lookup schema algorithm, as follows:
Lookup is based on path Family→Version→Model
Start with root node
Traverse based on path
If child is not found, return current Schema element FIGS. 7A-7C are graphs illustrating example graph data structures following further loading of various example schemas according to the techniques of this disclosure. FIG. 7A represents the state of the graph data structure of FIG. 6C following step H (which as noted above, does not change the graph data structure). In this example, suppose the schema element needs to be expanded with additional properties for models 3200, 2200, and 9200 of version 10.4 of a switch. As noted above, in these examples, version node 118 represents version 10.4 of the switch.

Controller device 10 may expand the graph data structure of FIG. 7A to form the graph data structure of FIG. 7B, which further includes model nodes 122A, 122B, for models 3200 and 2200, respectively. Model nodes 122A, 122B indicate support for the additional schema properties discussed above.

Upon loading additional schema properties for model 9200, controller device 10 may determine that the threshold value (of 3, continuing the examples discussed above) has been exceed, and therefore, may form the graph data structure of FIG. 7C. The graph data structure of FIG. 7C includes root node 110, family node 112, version node 124, and model node 120. In this example, version node 124 includes data representing support for the additional schema properties discussed above, whereas model node 120 indicates that this schema element is not supported, as discussed above.

Controller device 10 may be configured to perform the insertion algorithm discussed above. When updating the trie node, controller device 10 may determine whether the trie node already exists, and updates the trie node accordingly.

Controller device 10 may use the graph data structure to ensure deviations are set properly, while updating the trie nodes. In some examples, controller device 10 may further assign digital numbers for all model and version combinations, so that each schema element trie consumes less memory.

In this manner, the techniques of this disclosure include the following:
  A variant of a trie data structure that may be used to efficiently keep deviations of metadata to optimize speed and memory requirements and support:
    On demand loading of new path and value, and
    On demand updating of value nodes.
  Using this trie data structure to manage device model and version and schema with:
    On demand loading of a new schema, and
    On demand loading of new schema properties.

Figure 8:
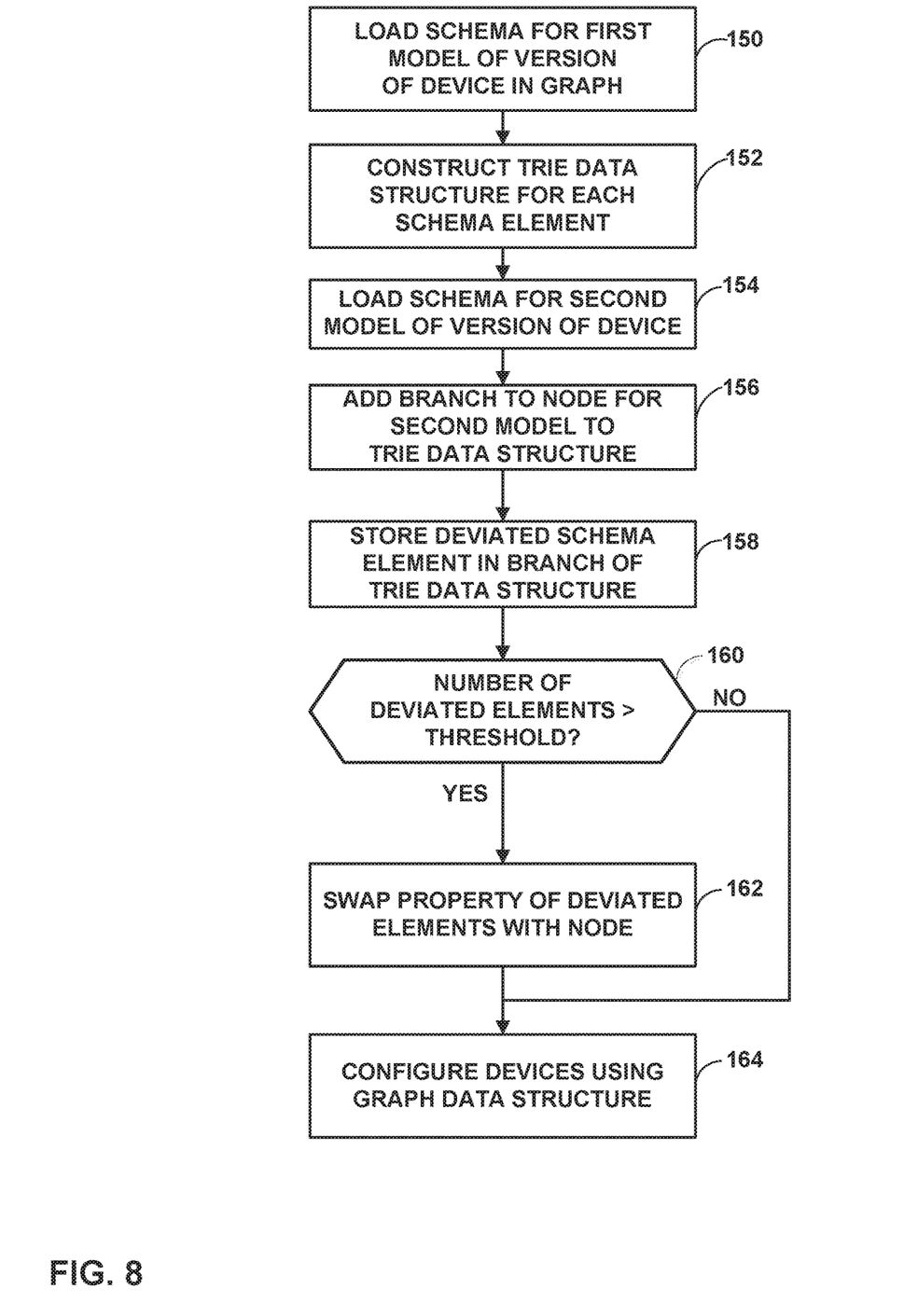
FIG. 8 is a flowchart illustrating an example method for performing techniques of this disclosure, e.g., for managing network devices.

FIG. 8 is a flowchart illustrating an example method for performing techniques of this disclosure, e.g., for managing network devices. The method of FIG. 8 is explained with respect to controller device 10, although other devices may be configured to perform this or a similar method.

Initially, controller device 10 loads a schema for a first model of a version of a device in a graph data structure (150). Controller device 10 may then construct trie data structures for each schema element (152). For example, as shown in FIG. 6A, the trie data structure may initially start with root node 110. Controller device 10 may then load a schema for a second model of the version of the device (154). In this example, it is assumed that the schema for the second model has at least one schema element that is a deviation relative to the first schema. Accordingly, controller device 10 adds a branch to the node for the second model to the trie data structure (156). Controller device 10 also stores the deviated schema element in the branch node of the trie data structure (158). For example, as shown in FIG. 6B, controller device 10 may add family node 112, version node 114, and model node 116A for the second model of the version of the network device to store a deviated schema element for the second model.

Additionally, controller device 10 may determine whether a number of deviated schema elements from branches of the node of the trie data structure exceeds a threshold (160). If the number of deviated elements exceeds the threshold ("YES" branch of 160), controller device 10 may swap the property of the deviated elements (that is, the branch node(s)) with the corresponding property of the node (162). For example, as shown in FIG. 6C, controller device 10 may replace version node 114 with version node 118, and remove the branch nodes for models 116A, 116B, 116C (and add model 120 as a branch node from version node 118). On the other hand, if the number of deviated elements does not exceed the threshold ("NO" branch of 160), or after performing the swap of 162, controller device 10 may configure managed network devices using the graph data structure (164).

In this manner, the method of FIG. 8 represents an example of a method including maintaining, by a controller device that manages a plurality of network devices, a graph data structure representing device level configuration schemas for the plurality of network devices, the graph data structure including trie nodes for every first device level configuration schema element for a first model of a version of network device of the plurality of network devices; obtaining, by the controller device, a second device level configuration schema elements based on a path for a second model of the version of the network device; determining, by the controller device, a deviation between the second device level configuration schema element and the first device level configuration schema element; and updating, by the controller device, the trie node to add a branch to a node representing the second device level configuration schema element.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method of managing a plurality of network devices, the method comprising:
maintaining, by a controller device that manages a plurality of network devices, a graph data structure representing device level configuration schemas for the plurality of network devices, the graph data structure including a trie node representing a first device level configuration schema element for a first model of a version of network device of the plurality of network devices;
obtaining, by the controller device, a second device level configuration schema element for a second model of the version of the network device;
determining, by the controller device, a deviation between the second device level configuration schema element and the first device level configuration schema element; and
updating, by the controller device, the trie node to add a branch to a node representing the second device level configuration schema element.

2. The method of claim 1, further comprising managing network devices of the plurality of network devices matching the version of the network device using the trie node of the graph data structure.

3. The method of claim 2, wherein managing the network devices comprises:
managing network devices that are the first model of the version of the network device using the first device level configuration schema element; and
managing network devices that are the second model of the version of the network device using the second device level configuration schema element.

4. The method of claim 2, wherein managing the network devices comprises:
setting configuration data of network devices that are the first model of the version of the network device according to the first device level configuration schema element; and
setting configuration data of network devices that are the second model of the version of the network device according to the second device level configuration schema element.

5. The method of claim 1, wherein obtaining the second device level configuration schema element comprises loading the second device level configuration schema element.

6. The method of claim 1, wherein obtaining the second device level configuration schema element comprises compiling an intent model including data for the second model of the version of the network device to produce the second device level configuration schema element.

7. The method of claim 1, further comprising:
determining a number of branches from the trie node of the graph data structure; and
in response to determining that the number of branches exceeds a threshold value:
swapping a property of the trie node with deviated properties of nodes of the branches; and
removing the branches.

8. The method of claim 1, further comprising receiving a path value, the method further comprising traversing the graph data structure to identify a node corresponding to the path value, comprising:
- starting at a root node of the graph data structure, recursively:
  - determining whether a current node of the graph data structure has a child node according to the path value;
  - when the current node has the child node, traversing to the child node; and
  - when the current node does not have the child node, returning a value of the current node.

9. The method of claim 1, further comprising setting a value in the branch representing whether the deviation indicates that a schema property of the trie node is not applicable to the second model of the version of the device or that the deviation includes additional schema properties relative to schema properties of the trie node.

10. A controller device that manages a plurality of network devices, the controller device comprising one or more processing units implemented in circuitry and configured to:
- maintain a graph data structure representing device level configuration schemas for the plurality of network devices, the graph data structure including a trie node representing a first device level configuration schema element for a first model of a version of network device of the plurality of network devices;
- obtain a second device level configuration schema element for a second model of the version of the network device;
- determine a deviation between the second device level configuration schema element and the first device level configuration schema; and
- update the trie node to add a branch to a node representing the second device level configuration schema element.

11. The controller device of claim 10, wherein the one or more processing units are further configured to manage network devices of the plurality of network devices matching the version of the network device using the trie node of the graph data structure.

12. The controller device of claim 11, wherein to manage the network devices, the one or more processing units are configured to:
- manage network devices that are the first model of the version of the network device using the first device level configuration schema element; and
- manage network devices that are the second model of the version of the network device using the second device level configuration schema element.

13. The controller device of claim 11, wherein to manage the network devices, the one or more processing units are configured to:
- set configuration data of network devices that are the first model of the version of the network device according to the first device level configuration schema element; and
- set configuration data of network devices that are the second model of the version of the network device according to the second device level configuration schema element.

14. The controller device of claim 10, wherein to obtain the second device level configuration schema element, the one or more processing units are configured to load the second device level configuration schema element.

15. The controller device of claim 10, wherein to obtain the second device level configuration schema, the one or more processing units are configured to compile an intent model including data for the version of the network device to produce the second device level configuration schema element.

16. The controller device of claim 10, wherein the processing units are further configured to:
- determine a number of branches from the trie node of the graph data structure; and
- in response to determining that the number of branches exceeds a threshold value:
  - swap a property of the trie node with deviated properties of nodes of the branches; and
  - remove the branches.

17. The controller device of claim 10, wherein the one or more processing units are further configured to:
- receive a path value;
- starting at a root node of the graph data structure, recursively:
  - determine whether a current node of the graph data structure has a child node according to the path value;
  - when the current node has the child node, traverse to the child node; and
  - when the current node does not have the child node, return a value of the current node.

18. The controller device of claim 10, wherein the one or more processing units are further configured to set a value in the branch representing whether the deviation indicates that a schema property of the trie node is not applicable to the second model of the version of the device or that the deviation includes additional schema properties relative to schema properties of the trie node.

19. A computer-readable storage medium comprising instructions that, when executed, cause a processor of a controller device that manages a plurality of network devices to:
- maintain a graph data structure representing device level configuration schemas for the plurality of network devices, the graph data structure including a trie node representing a first device level configuration schema element for a first model of a version of network device of the plurality of network devices;
- obtain a second device level configuration schema element for a second model of the version of the network device;
- determine a deviation between the second device level configuration schema element and the first device level configuration schema element; and
- update the trie node to add a branch to a node representing the second device level configuration schema element.

20. The computer-readable storage medium of claim 19, further comprising instructions that cause the processor to manage network devices of the plurality of network devices matching the version of the network device using the trie node of the graph data structure, comprising instructions that cause the processor to:
- set configuration data of network devices that are the first model of the version of the network device according to the first device level configuration schema element; and
- set configuration data of network devices that are the second model of the version of the network device according to the second device level configuration schema element.

* * * * *